Feb. 19, 1946.  J. FLATT  2,395,042
EFFICIENCY DETERMINING DEVICE
Filed Sept. 20, 1943   2 Sheets-Sheet 1

INVENTOR
JOSEPH FLATT
ATTORNEYS

Feb. 19, 1946.  J. FLATT  2,395,042
EFFICIENCY DETERMINING DEVICE
Filed Sept. 20, 1943   2 Sheets-Sheet 2
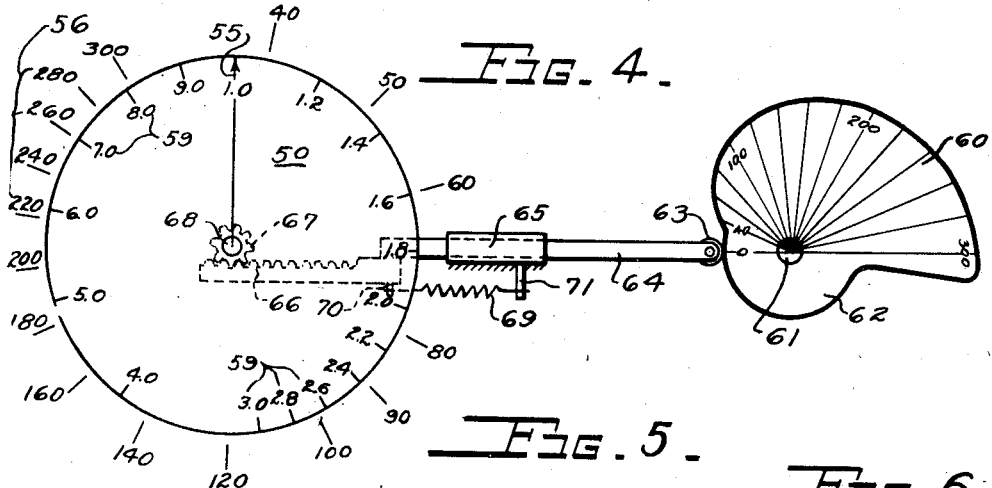
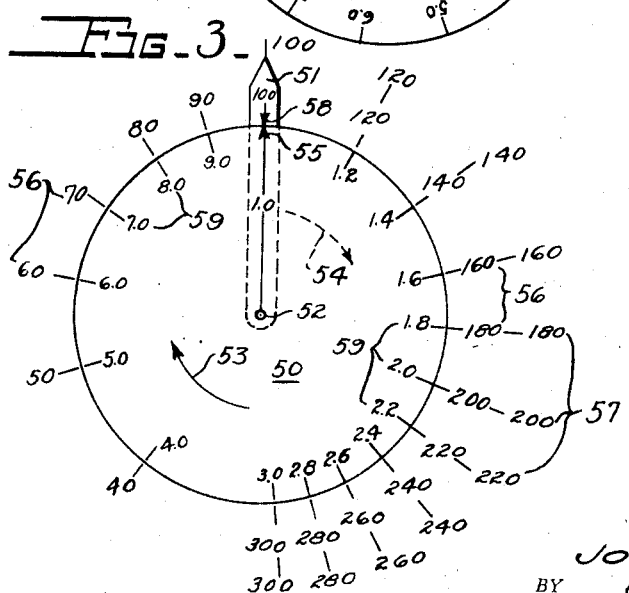
INVENTOR
JOSEPH FLATT Patented Feb. 19, 1946

2,395,042

UNITED STATES PATENT OFFICE 2,395,042

EFFICIENCY DETERMINING DEVICE

Joseph Flatt, Dayton, Ohio

Application September 20, 1943, Serial No. 503,040

4 Claims. (Cl. 235—61)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device for determing the operating efficiency of automotive vehicles and more particularly to an improved means for continuously indicating the ratio of the speed at which the vehicle is traveling to the rate at which fuel is being consumed by the engines of said vehicle.

It is known that various devices have been constructed for accomplishing this purpose in connection with automobiles and other land vehicles, but it is not believed that this object has ever been accomplished in connection with aircraft or by the specific means which will be disclosed hereinafter.

Accordingly, it is the primary object of this invention to provide a device for determining the air miles traveled by an aircraft per unit of fuel consumed.

Another important object of this invention is to provide an apparatus which will automatically indicate on a dial, by means of a simple and novel mechanism, the over-all efficiency of an automotive vehicle.

A further object of this invention resides in the utilization of a pair of logarithmic cams cooperating with a pointer for indicating the ratio of the speed of an automotive vehicle to the rate at which fuel is being consumed thereby.

A further object of this invention resides in the utilization of a pair of relatively movable elements for determining and indicating the ratio of the speed of a vehicle to the rate at which it is consuming fuel, one of said elements being movable in accordance with the logarithm of the speed of the vehicle and the other of said elements being movable in accordance with the logarithm of the rate at which fuel is being consumed.

Still a further object of this invention lies in the provision of a device for determining the ratio of speed to fuel flow, which device may be situated at a distance from the instruments which indicate the speed of the vehicle and the rate at which it is consuming fuel.

In general, the present invention consists of a simple mechanism for operating a pointer element which indicates the number of miles traveled by a vehicle per unit of fuel consumed. According to one modification of the present invention a logarithmic cam is positioned in accordance with the speed at which the vehicle is traveling, the contour of the cam corresponding to the logarithm of the speed of the vehicle. A second logarithmic cam, which cooperates with the first, is positioned in accordance with the rate at which fuel is consumed by the power plant of the vehicle and is shaped to correspond to the cologarithm of the rate of flow. A pointer or other suitable indicating element is actuated by the second cam to indicate the ratio of speed to fuel flow, which ratio represents the miles traveled by the vehicle per unit of fuel consumed.

According to another modification of the invention, an air-speed pointer and a fuel-flow dial are mounted for rotation about a common center. The pointer and dial each move in the same direction in accordance with the logarithm of the speed at which the vehicle is traveling and the rate at which it consumes fuel respectively. The ratio of miles per hour to gallons per hour is indicated by the relative positions of the dial and the pointer and may be read off directly from a scale marked on the face of the dial.

The present apparatus is designed primarily for use with aircraft where it is often important to know the number of air miles traveled per gallon of gasoline consumed by the engine or engines thereof. This, of course, is a measure of the over-all efficiency of the vehicle and it is desirable in certain instances to operate the craft under those conditions which yield the highest ratio of miles per gallon. This is true, for example, when an aircraft is engaged on a long range bombing mission where it is imperative that every possible pound of fuel be conserved in order that the craft may reach the target area with enough fuel still left in its tanks for the return trip home. The present device is designed for installation on the instrument panel of an aircraft where it can be readily referred to by the pilot in order that he may adjust the throttle control, the manifold pressure, the mixture setting, the pitch of the propeller, etc., so as to attain the highest possible ratio of miles traveled per gallon of gasoline consumed.

In order to indicate the ratio of air speed to fuel consumption it is necessary to divide the air speed in miles per hour by the rate of fuel flow in gallons per hour to obtain a quotient which will represent the miles traveled per gallon of fuel consumed. This is accomplished in the present apparatus by subtracting the logarithm of the rate of fuel flow from the logarithm of the air speed, thus giving the desired quotient in miles per gallon. The resulting quotient is then indicated by a suitable pointer on a scale which may be located in front of the pilot on the instrument panel of the aircraft.

While the devices which are about to be described, represent preferred embodiments of my invention, it is to be understood that these are not the only ways in which the invention may be practiced and that the details of the constructions herein shown and described are for the purpose of illustration only and are not intended to limit the scope of my invention as defined by the claims appended hereto.

In the drawings:

Figure 3 is a diagrammatic view of another form of device which may be used in carrying out my invention;

Figure 4 is a diagrammatic view of an apparatus for transforming a linear displacement into a logarithmic one;

Figure 5 is a plan view of a computer which is adapted to carry out the principles illustrated in connection with Figure 3;

Figure 6 is a side elevation of the computer shown in Figure 5.

Figure 1:
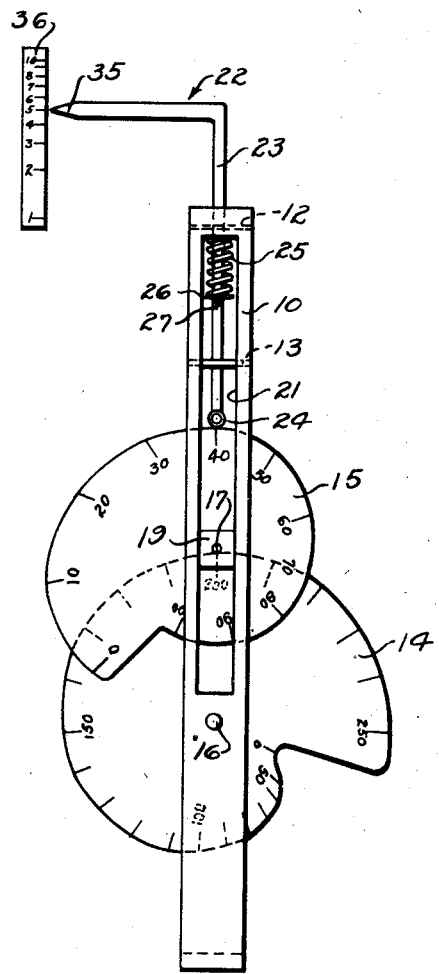
Figure 1 is a plan view of one form of an apparatus for carrying out the invention.
Figure 2:
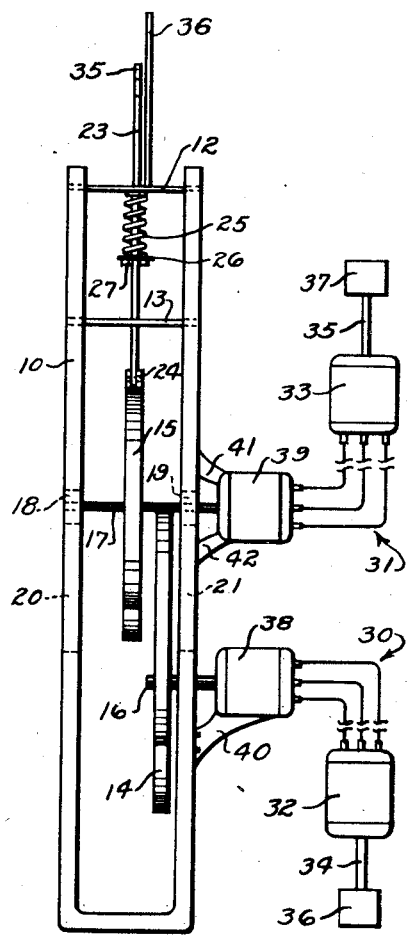
Figure 2 is a side elevation of the mechanism shown in Figure 1, the means for positioning the cams being omitted from this view for the sake of clarity.

In the first modification of my invention shown in Figures 1 and 2 of the drawings, the reference numeral 10 indicates a U-shaped frame constructed of a strip of steel or other suitable material bent to form an elongated U-shaped member. The upper ends of the U-shaped frame 10 are spaced apart and are held rigidly in this spaced position by means of two spaced plates 12 and 13. Within the frame 10 an air-speed cam 14 and a fuel flow cam 15 are rotatably supported on their respective shafts 16 and 17. The cam 14 is rigidly secured on the end of the shaft 16, which shaft is journalled in the right-hand leg of the U-shaped frame 10, as seen in Figure 2. The cam 15 is secured to the shaft 17, which shaft is journalled in the sliding blocks 18 and 19 which are free to travel up and down within the slots 20 and 21 formed in each of the legs of the frame 10. As will be seen from the drawings, the shaft 17 normally rests on the perimeter of the cam 14 and is free to move up and down as the latter cam rotates by means of the sliding journal blocks 18 and 19. A pointer 22 is provided with a vertical stem 23 which is guided for sliding movement in a vertical direction by means of suitable guide holes formed in the spacing plates 12 and 13. The lower end of the leg 23 is provided with a small roller 24 which bears against the perimeter of the fuel flow cam 15. A compression spring 25 is compressed between the plate 12 and a washer 26 held in position on the stem 23 by means of a pin 27 passing through the stem. The spring 25 thereby serves to yieldingly urge the roller 24 into contact with the cam 15 and also to press the shaft 17, on which the cam 15 is mounted, into contact with the periphery of the air-speed cam 14. The cams 14 and 15 are positioned in accordance with the fuel flow and air speed respectively by means of the torque amplifying, remote positioning devices 30 and 31, respectively. The units 30 and 31 each have associated therewith transmitters 32 and 33, respectively, which are connected by shafts 34 and 35 to an air-speed indicator 36 and a fuel-flow meter 37. The transmitters 32 and 33 serve to transmit the positions assumed by the air-speed indicator pointer and the fuel-flow meter pointer to the receivers 38 and 39. The units 30 and 31 are of conventional design and as before stated serve to position the cams 14 and 15 in accordance with the movement of their respective instrument pointers without placing any appreciable load on these pointers. Receivers 30 and 31 are quite small and compact and therefore the receiver 31 has been shown mounted directly on the end of the floating shaft 17 though it is to be realized of course that, if desired, the receiver 39 may be rigidly secured to the frame 10 and the cam 15 driven by means of any of the well-known splined shaft and sliding gear arrangements.

In order to enable the receivers 38 and 39 to transmit a torque to the shafts 16 and 17, respectively, it is necessary that the receiver housings be anchored to the frame 10. This may be accomplished in the case of the receiver 38 by providing a bracket 40 integral with the housing thereof, which bracket is bolted to the frame 10. Since the receiver 39 must be free to slide up and down with respect to the frame, the housing of this receiver is shown provided with two brackets 41 and 42 which are slidable up and down within the slot 21 in the same manner as the block 19.

As shown in Figure 1 the air-speed cam is capable of representing speeds of from fifty miles per hour to two hundred and fifty miles per hour, the circumference of the cam being shaped in accordance with the logarithm of the various air speeds lying within this range. That is, the length of the various radii extending from the center of the shaft 16 to the periphery of the cam are proportional to the logarithms of the various air speeds represented by these radii. In the case of air speeds of less than 50 miles per hour the radii would, of course, become progressively smaller and would finally reduce to zero for a speed of one mile per hour. Since it is impractical to cut the cam to represent these small air speeds, the surface of the cam between zero and 50 miles per hour has been shaped in an arbitrary manner, it not being intended that the device should be used within this range. With regard to the fuel-flow cam 15, the circumference of this cam has been shaped to represent the cologarithms of the various rates of fuel flow between 10 to 100 gallons per hour. The method followed in laying out the circumference of this cam is the same as that followed in connection with the cam 14 with the exception, of course, that the radii from the center of the shaft 17 to various points on the circumference of the cam are laid out in accordance with the cologarithms of the various fuel flow readings rather than with the logarithms thereof. For rates of fuel flow approaching one gallon per hour, the radii would, of course, increase to infinity, and for this reason the surface of the cam between zero and 10 gallons per hour has been shaped in accordance with an arc of constant radius from the center of the shaft 17. This expedient, while it renders the cam inoperative between zero and ten gallons per hour, facilitates the construction of a practicable and workable cam and does not interfere with the operation of the device over the more useful range of values extending from ten to one hundred gallons per hour.

In Figure 1 the cam 14 is shown in the position which it would assume when the air-speed indicator reads 200 miles per hour and the cam 15 is shown in the position which it would occupy when the fuel-flow meter reads 40 gallons per hour. By virtue of the manner in which the cams are arranged, the cologarithm of 40 gallons per hour is physically added to the logarithm of 200 miles per hour which, of course, is equivalent to subtracting the logarithms of 40 gallons per hour from the logarithm of 200 miles per hour. This is the same as dividing 200 miles per hour by 40 gallons per hour which results in a quotient of 5 miles per gallon.

It will be seen that the pointer 22 is provided with a wedge-shaped portion 35 which cooperates with a suitable scale 36 for indicating the ratio of air speed to fuel flow in miles per gallon which, in this case, is 5. With this indication before him, the pilot of the aircraft can readily adjust the various controls of the craft to the point of maximum efficiency as indicated by the position of the pointer 35 along the scale 36.

It will be observed that the transmitters 32 and 33 may be located anywhere on the aircraft, while the receivers 38 and 39 together with the remainder of the apparatus shown in the drawings, may be placed on the instrument panel. Hence, the present device is capable of being located in the most convenient position for the pilot to observe the readings of the dial and it is also adapted for easy and quick installation in the desired location. It is to be understood that while the present modification of the device is intended to cover a range of air speeds from 50 to 250 miles per hour and a range of fuel flow from 10 to 100 gallons per hour, these ranges are for the purpose of illustration only and the cams 14 and 15 may be laid out in accordance with any reasonable range of values. Similarly, the scale 36, which has been illustrated with readings from 1 to 10 miles per gallon, may likewise be modified to indicate any other suitable range of miles per gallon values.

Another modification of the present invention is illustrated in Figures 3 to 6, inclusive, wherein a fuel-flow dial 50 and an air-speed pointer 51 (Figure 3) are mounted for rotation about a common axis 52. The dial 50 and pointer 51 are each rotatable in clockwise direction, as indicated by the arrows 53 and 54 respectively, in accordance with the logarithms of the fuel flow and air speed respectively; that is, the angular displacement of the dial and pointer correspond to the logarithm of the fuel flow and air speed respectively, rather than as a straight linear function of these values. The dial 50 is provided with an index 55, which cooperates with a logarithmic fuel-flow scale 56 which lies just beyond the periphery of the dial 50. The pointer 51 cooperates with an air-speed scale 57 which extends around the right-hand side of the dial 50 beyond the fuel-flow scale 56. The pointer 51 is provided with an index 58 which cooperates with a miles-per-gallon scale 59 which is marked off on the dial 50 around the periphery thereof.

As shown in Figure 3, the air-speed pointer 51 occupies the position which it would assume for an air speed of 100 miles per hour, while the fuel-flow dial 50 occupies the position which it would assume for a fuel consumption of 100 gallons per hour. The ratio of these two values is one mile per gallon as indicated opposite the index 58 on the scale 59 lying on the face of the dial 50.

The principle of operation of this device is the same as that of a circular slide rule wherein the logarithm of the divisor is subtracted from the logarithm of the dividend to give the logarithm of the quotient. For example, should the speed of the aircraft increase so as to cause the air-speed pointer 51 to move two divisions clockwise along the scale 57 to the numeral 140, while the fuel-flow dial 50 remained in its present position, as shown in Figure 3, the index 58 would then indicate a ratio of 1.4 miles per gallon on the scale 59. This results from the fact that the logarithm of one hundred gallons per hour is physically subtracted from the logarithm of one hundred and forty miles per hour to give a quotient of 1.4 miles per gallon. This subtraction of logarithms is carried out in each case as the settings of the fuel-flow dial 50 and the air-speed pointer 51 are varied in accordance with the changed conditions of operation of the aircraft.

In order to utilize the type of device shown in Figure 3, it is, of course, necessary that the dial 50 and the pointer 51 will be displaced in accordance with the logarithm of the rate of fuel flow and with the logarithm of the air speed, and further that the logarithmic scales 56 and 57 be identical with one another. It is old and well known in the art to provide air-speed indicators which follow a logarithmic scale. To my knowledge, however, there are at the present time no rate-of-flow meters which indicate in logarithmic fashion the rate of flow of fuel. It is a comparatively simple matter, however, to obtain any desired displacement of the fuel-flow dial 50 no matter what the displacement of the fuel-flow meter may be. One form of device for enabling such conversion to be made is shown in Figure 4 wherein a logarithmic cam 60 is shown secured to a shaft 61 which is connected to the fuel-flow meter. It will be assumed in the present discussion that the cam 60 is rotated in accordance with the rotation of the hand of a fuel-flow indicator, which moves in equal increments around its dial for equal increments of fuel flow. This type of motion is indicated by the lines scribed across the face of the cam 60, each of which represents an increment of twenty gallons per hour of fuel flow. For the sake of simplicity, only the lines representing 40, 100, 200 and 300 gallons per hour have been indicated in the drawings. It will also be noted that the total displacement of the cam 60 is something in the neighborhood of 180 degrees of rotation, whereas it is desired to rotate the dial 50 through 360 degrees. The periphery of the upper half of the cam 60 is shaped in accordance with the logarithms of the various rates of fuel flow, i. e. the distance from the center of the shaft 61 to the periphery along the line marked 40 is proportional to the logarithm of 40 while the distance from the center of the shaft 61 to the periphery along the line marked 100 is proportional to the logarithm of 100, and so on. Inasmuch as only those fuel-flow readings ranging from 40 to 300 are to be used, the lower half 62 of the cam 60 is made concentric with the axis 61 and is of somewhat smaller diameter than the remainder of the cam.

A small roller 63 located in the end of a rod 64 bears against the periphery of the cam 60. The rod 64 is guided for straight-line movement in the guide block 65 which is secured to the framework of the mechanism. The left-hand end of the rod 64 is provided with an off-set rack 66 which cooperates with a gear 67 which is secured to a shaft 68 on which the dial 50 is mounted. The roller 63 is resiliently urged into engagement with the periphery of the cam 60 by means of a tension spring 69 which is secured at one end to a pin 70 mounted in the rack 66 and at the other end to a pin 71 mounted in the guide block 65. By a proper choice of the diameter of the gear 67, the dial 50 may be caused to rotate clockwise through 360 degrees as the cam 60 rotates through approximately 180 degrees. It will now be seen that the dial 50 will be displaced logarithmically rather than linearly, due to the fact that the cam 60 is shaped in accordance with the logarithms of the various rates of fuel flow. By proper design of the cam 60 and by proper selection of the gear 67, it will be possible to obtain the desired displacement of the dial 50 from any of the conventional fuel-flow indicators on the market today.

It is, of course, apparent that the device shown in Figure 4 could also be used to secure the desired logarithmic displacement of the air-speed pointer 51 from any of the conventional air-speed indicators which do not operate in a logarithmic fashion.

A practical form of the slide rule type of miles-per-gallon indicator is illustrated in Figures 5 and 6. The gallons-per-hour scale 56 and the miles-per-hour scale 57 have been eliminated inasmuch as they are not necessary in the practical form of the device and were shown in Figure 3 merely for the purpose of explaining the principles upon which the slide rule type of indicator operates. As shown in Figures 5 and 6 the fuel-flow dial 50 and an air-speed pointer 75 are mounted for rotation about a common axis. The dial 50 is secured to a flange 76 formed integrally on the end of a shaft 77 while the air-speed pointer 75 is secured to a flange 78 formed integrally on the end of a sleeve 79 encompassing the shaft 77. The pointer 75 is provided at its outer end with an index plate 80 which may be secured to the pointer 75 by riveting or welding it thereto. An index line 81 is scribed on the face of the plate 80 and is adapted to cooperate with the miles-per-gallon scale 59 inscribed on the face of the dial 50 around the periphery thereof. Both the dial 50 and the pointer 75 are arranged for rotation in a clockwise direction as indicated by the arrows 82 and 83 respectively. The dial 50 and pointer 75 are arranged for movement in accordance with the logarithms of the fuel flow and air speed respectively, the dial 50 being driven through the shaft 77 and the pointer 75 being driven through the sleeve 79. The relative movement between the dial 50 and the pointer 75 is indicated by the index line 81 which cooperates with the miles-per-gallon scale 59 to thereby indicate to the pilot of the aircraft the operating efficiency of the vehicle.

In Figure 5 the relative movement between the dial and pointer is assumed to have been such as to cause the device to indicate an operating efficiency of one and eight-tenths miles per gallon.

The shaft 77 and the sleeve 79 may be positioned either by means of the torque amplifying, remote positioning devices mentioned in connection with the first modification of my invention, or they may be operated directly from the fuel-flow indicator and air-speed indicator in case it is found desirable to build these instruments into the device so as to provide a self-contained unit. The dial and pointer may be constructed of lightweight materials so as to place but very little load on the operating mechanisms of the instrument.

While apparatus herein shown and described represents a preferred embodiment of the present invention, it is to be understood that the invention is not limited to a particular embodiment or application thereof, but includes within its scope such changes or modifications as fairly come within the spirit of the appended claims.

I claim:

1. An apparatus for determining the ratio of a first quantity to a second quantity comprising a frame having a rectilinear guide track therein, a block cooperating with said track for sliding movement along said frame, a journal mounted in said block having its axis located at right angles to the longitudinal axis of said track, a cam rotatably mounted on said journal, a second cam mounted in said frame for rotation about an axis parallel to the axis of said journal, said second cam coacting with said journal for the purpose of positioning said first cam along said track in accordance with the setting of said second cam, the circumference of one of said cams being shaped in accordance with the logarithms of the various values assumed by said first quantity and the circumference of the other of said cams being shaped in accordance with the cologarithms of the various values assumed by said second quantity, an indicating element mounted in said frame for sliding movement along the longitudinal axis of said track, and means for maintaining said element in contact with the perimeter of the first-mentioned cam at all times to thereby indicate the ratio of the quantities.

2. An apparatus for determining the ratio of a first quantity to a second quantity comprising a frame, a carrier supported in said frame for sliding movement relative thereto along a predetermined axis, a first element having a cam face representative of the various values assumed by one of said quantities and mounted on said carrier in such a manner as to enable the cam face thereof to move substantially at right angles across said predetermined axis, a second element having a cam face representative of the various values assumed by the other of said quantities and supported in said frame in such a manner as to enable the cam face thereof to move substantially at right angles across said predetermined axis, the cam face representing the values assumed by the first quantity being laid out in accordance with the logarithms of those values and the cam face representing the values assumed by the second quantity being laid out in accordance with the cologarithms of those values, the cam face of said second element coacting with said carrier for the purpose of positioning said first element along said predetermined axis in accordance with the setting of said second element, and an indicating element slidably mounted in said frame for movement along said predetermined axis, said element being adapted to bear against the cam face of said first element and thereby indicate the ratio of the quantities.

3. An apparatus for determining the miles traveled by an automotive vehicle per gallon of gasoline consumed comprising means for indicating the speed of the vehicle, means for indicating the rate at which fuel is consumed by the vehicle, a remote positioning, torque amplifying means for transmitting said indications to a remote point, and means located at said remote point for determining the ratio of speed to fuel flow, said means including a frame, a slide member mounted for substantially rectilinear sliding movement along said frame, a cam mounted on said slide member for rotation about an axis located at right angles to the path of movement of said slide member, a second cam mounted on said frame for rotation about an axis lying parallel to the axis of rotation of the first-mentioned cam, said second cam coacting with said slide member so as to move said first-mentioned cam along the path followed by said slide member, one of said cams being rotated to a position corresponding to the speed of the aircraft and having its circumference shaped in accordance with the logarithm of speed and the other of said cams being rotated to a position corresponding to the rate of fuel flow and having its circumference shaped in accordance with the cologarithm of the rate of fuel flow, and an indicating element mounted on said frame for sliding movement along the path followed by said slide member, said element being adapted to bear against the perimeter of said first-mentioned cam so as to indicate the ratio of speed to fuel flow.

4. A device for determining the ratio of a first variable quantity to a second variable quantity, such as the number of miles being flown by an aircraft to the rate of fuel being consumed by the aircraft, said device comprising a first cam calibrated logarithmically in accordance with variations in the first variable quantity, a second cam rotatable and bodily displaceable by said first cam and calibrated co-logarithmically in accordance with the variations in the second variable quantity, and an indicator differentially movable, directly by said second cam and indirectly by said first cam incident to the displacement of the second cam by the first cam, in accordance with the sum of the logarithm and cologarithm of the variable quantities indicated by the first and second cams, indicating the ratio of the first variable quantity to the second variable quantity.

JOSEPH FLATT.